Sept. 24, 1968   J. H. RICHMOND ET AL   3,403,356

RECIPROCAL MICROWAVE POLARIZATION ROTATOR

Filed June 14, 1966

*INVENTORS.*
JACK H. RICHMOND and
WALTER JAMES WESNER

*ATT'YS.*

United States Patent Office 3,403,356
Patented Sept. 24, 1968

3,403,356
RECIPROCAL MICROWAVE POLARIZATION ROTATOR
Jack H. Richmond, Columbus, Ohio, and Walter J. Wesner, Morristown, N.J., assignors, by mesne assignments, to the United States of America as represented by the Secretary of the Navy
Filed June 14, 1966, Ser. No. 558,210
4 Claims. (Cl. 333—21)

This invention relates to polarization control of electromagnetic energy and more particularly to a reciprocal waveguide device for controlling the orientation of a linearly polarized electromagnetic field vector in a circular waveguide.

In some microwave applications it is advantageous to be able to control the polarization of the antenna. Antenna pattern measurement frequently requires the patterns of both horizontally and vertically polarized radiation. This is usually accomplished by rotating the test antenna 90°, but electronic remotely controlled rotation would be more convenient. In an active radar system a loss of the received signal power will occur unless the polarization is the same for transmitting and receiving. This explains the need for a reciprocal polarization rotator.

An analysis of a linearly polarized wave shows that it may be thought of as being comprised of two circularly polarized waves whose field vectors are rotating in opposite directions. The orientation of the linearly polarized field vector is then dependent upon the point where the two circularly polarized vectors cross. By delaying one of the circularly polarized vectors by $\theta$ degrees with respect to the other vector the angle of orientation is changed by $\theta/2$ degrees. The delay is caused, in this invention, by changing the propagation constant by periodic loading of the waveguide. Small susceptance elements or probes are placed at equal intervals of $\lambda/4$ where $\lambda$ represents the wavelength in the circular waveguide. The loading is assumed to be uniform, and hence the propagation constant is uniformly altered. Furthermore, the susceptance elements can be positioned to give a maximum effect on one circularly polarized component and a minimum effect on the other. Then by controlling the amount of susceptance, the orientation of the linearly polarized vector can be varied. The susceptance of each probe is controlled by coupling variable capacitors from each probe to the waveguide. It is therefore a general object of this invention to control the orientation of the field vector of a linearly polarized wave in a circular waveguide by means of a series of variable susceptance elements.

Other objects, uses, advantages and novel features of the invention will become apparent from the following detailed description of the invention when considered in conjunction with the accompanying drawing, in which.

Figure 1:
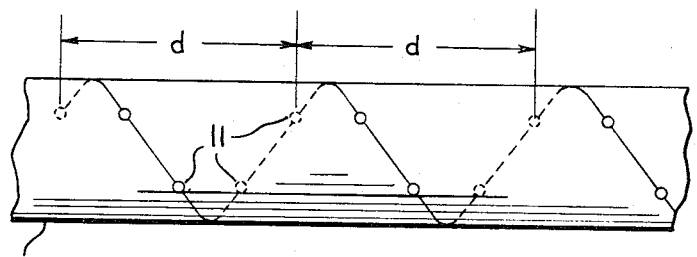
FIGURE 1 illustrates the positioning of susceptance probes in a longitudinal section of circular waveguide.

Referring in particular to FIGURE 1, a section of circular waveguide 10 has positioned therein a series of susceptance elements or probes 11. These probes 11 are positioned in a helical formation, where the lead of the helix is equal to one wavelength of the frequency of the transmitting signal source in the waveguide. The probes 11 are arranged in a helix because the field vector of a circularly polarized wave follows a helical path in traveling down the waveguide. By placing the probes at uniform intervals of $\lambda/4$, optimum results are obtained. FIGURE 1 shows the probes 11 placed at intervals of $\lambda/4$, and the dotted circles represent the probes on the underside of the waveguide (if it is being viewed from the top) and the solid circles represent those probes on the top of the waveguide. The circles are shown connected simply to trace the helix formed by the probes 11. The helix upon which the probes are arranged is in the direction of rotation required to delay the right-circularly polarized vector and to have a very slight effect upon the left-circularly polarized vector. The lead distance $d$ represents one wavelength and it is seen the probes 11 divide this lead distance in $\lambda/4$ intervals. The right-circularly polarized vector is delayed since the susceptance elements are predominately parallel to this vector, and more closely coupled to this vector than to the left-circularly polarized vector, due to the direction of rotation of the helix.

Figure 2:
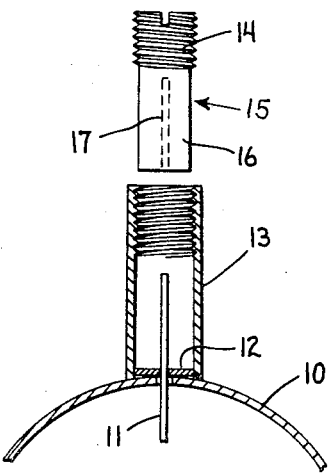
FIGURE 2 shows a partial cross-sectional view of the waveguide in an embodiment where the variable capacitance, coupled between the probe and the waveguide, may be manually controlled.

FIGURE 2, a partial cross sectional view of the circular waveguide 10, shows the probe 11 extending into the waveguide 10, and also shows a manually variable capacitive device which couples a capacitance between the probe 11 and the waveguide. An insulating disc 12 is placed around each probe 11 to provide an electrical insulation between the probe and the waveguide. A cylindrical tube 13 is mechanically attached concentrically with the probe, in a manner which also gives a good electrical connection, to the waveguide 10. The inside of the tube 13 is threaded, on the end away from the waveguide, to receive the threaded portion 14 of a cylindrical slug 15. The slug 15 is comprised of the threaded section 14, and a dielectric section 16 having a hole 17 drilled along its longitudinal axis. When the slug 15 is inserted in the tube 13, the dielectric section 16 surrounds the probe 11 thereby forming a capacitor between the probe 11 and the waveguide 10. The value of the capacitance may be varied by adjusting the depth of penetration of the slug 15 thereby changing the coupling of the dielectric material. By varying the value of the capacitance the susceptance of the probe is varied and this in turn varies the amount of delay between the rotating field vectors.

Figure 3:
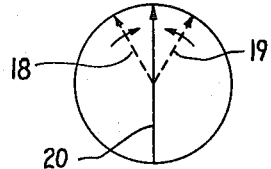
FIGURE 3 represents two circularly polarized vectors rotating in opposite directions at an instant when they are 60° apart and approaching each other.
Figure 4:
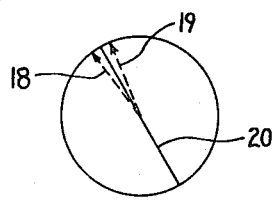
FIGURE 4 represents the same situation as FIGURE 3 at an instant when the two vectors are aligned.

FIGURES 3 and 4 are shown to illustrate the relation between the delay of one circularly polarized field vector and the change in orientation of the resultant linearly polarized vector. In FIGURE 3 the two circularly polarized vectors 18 and 19 are represented as rotating in opposite directions at an instant when they are 60° apart and approaching each other. It is seen that the resultant linearly polarized vector 20 would be vertically oriented in this case. If, however, the vector 18 were to be delayed 60° as shown in FIGURE 4, vector 19 would be aligned with vector 18, and the orientation of the linearly polarized vector 20 would be shifted 30° to the left of the vertical.

Figure 5:
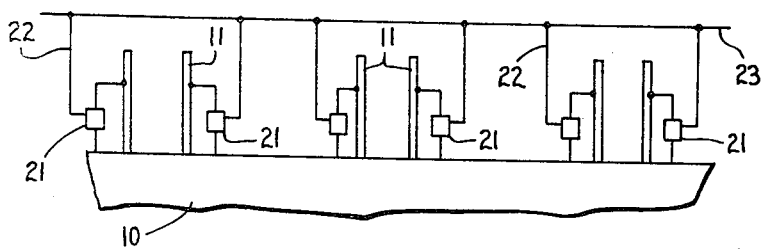
FIGURE 5 shows an embodiment where electronically variable capacitors are used; their respective control means being coupled together to allow automatic control.

Referring now to FIGURE 5, a partial sectional view is shown of an embodiment using electronically variable capacitors 21, which are coupled between the probes and the waveguide. All of the control leads 22 of the capacitors 21 may be coupled together and also coupled to a variable potential (not shown) by conductor 23. Varactors may be used as the variable capacitors in this situation, eachh aving one lead coupled to its respective probe and the other lead coupled to the waveguide. In that case, if the waveguide is maintained at a fixed potential or ground, then all the probes may be coupled together and to the variable potential. Using electronically variable capacitors, all of the capacitors may be varied by one adjustment, or they may be automatically varied in some predetermined manner. This automatic variability may be useful in an aircraft situation where the radar signal must be transmitted through a randome, and where it would be desirable to control the angle of incidence of the radiating wave with respect to the randome.

In analyzing this device it is seen to be reciprocal in that a returning wave will be shifted back to its original orientation.

It will be understood that various changes in the details, which have been herein described and illustrated in order to explain the nature of the invention, may be made by those skilled in the art within the principle and scope of the invention and we desire to be limited only in the scope of the appended claims.

We claim:
1. A reciprocal waveguide device for controlling the orientation of a linearly polarized electromagnetic field vector in a circular waveguide, comprising:
   a plurality of susceptance probe means arranged in a helical array in a section of circular waveguide, the helix of said helical array having a lead length equal to one wavelength of the frequency being transmitted, said probe means extending through the wall of said waveguide and protruding diametrically into said waveguide, wherein the number of said probe means that are required and the depth of said diametric protrusion into said wall is predetermined by the amount of susceptance coupling that is necessary for a particular application, said probe means being electrically insulated from said waveguide; and
   a plurality of variable capacitance means, one of said capacitance means coupled from each of said probe means, on the outside of said circular waveguide, to said circular waveguide, whereby the orientation of a linearly polarized field vector may be changed by adjusting the values of said plurality of variable capacitance means.

2. A reciprocal waveguide device for controlling the orientation of a linearly polarized electromagnetic field vector in a circular waveguide, as described in claim 1, wherein:
   said plurality of variable capacitance means are mechanically adjustable capacitors.

3. A reciprocal waveguide device for controlling the orientation of a linearly polarized electromagnetic field vector in a circular waveguide, as described in claim 2, wherein:
   each of said mechanically adjustable capacitors comprises:
      a cylindrical tube of a conductive metal, attached concentrically with said probe means to the outside of said circular waveguide, and having its end away from said waveguide internally threaded; and
      a slug means having a first and a second section, said first slug means section being of a dielectric material and having a hole therein along the longitudinal axis such that when said slug means is inserted in said cylindrical tube it will surround said probe means, said second section of said slug means being externally threaded such that when said slug means is inserted in said cylindrical tube, the threads of said second section will engage the threads of said tube, whereby the adjustment of the engagement of threads will cause a change in capacitance between said probe means and said waveguide because this adjustment causes a change in coupling of said dielectric material between said probe means and said cylindrical tube.

4. A reciprocal waveguide device for controlling the orientation of a linearly polarized electromagnetic field vector in a circular waveguide, as described in claim 1, wherein:
   said plurality of variable capacitance means are electronically variable capacitance means, said electronically variable capacitance means having their control means coupled together to permit variance of all capacitance values simultaneously.

References Cited
UNITED STATES PATENTS 3,296,558   1/1967   Bleackley _____ 333—21

HERMAN KARL SAALBACH, *Primary Examiner.*

M. NUSSBAUM, *Assistant Examiner.*